April 3, 1962 S. W. CAHILL ET AL 3,028,187
PARACHUTE RELEASE HOOK
Filed Aug. 11, 1958 2 Sheets-Sheet 1
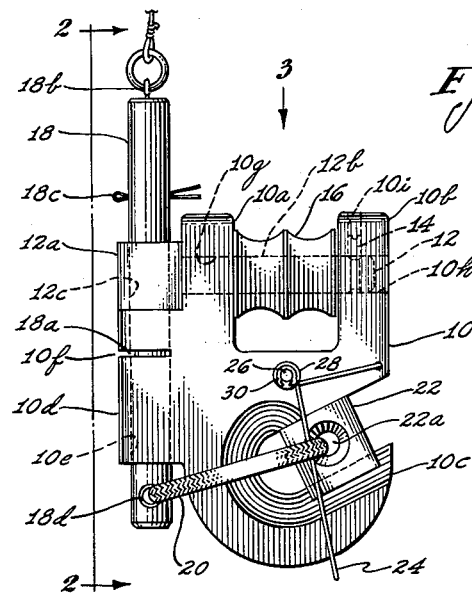
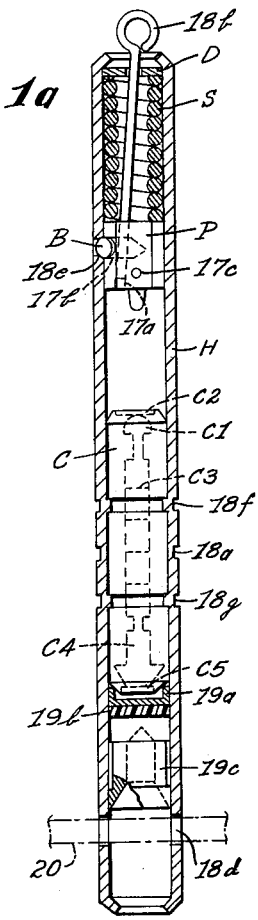
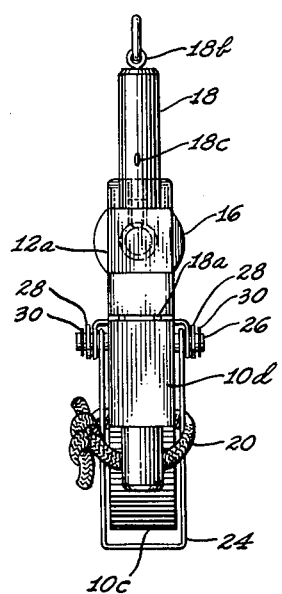
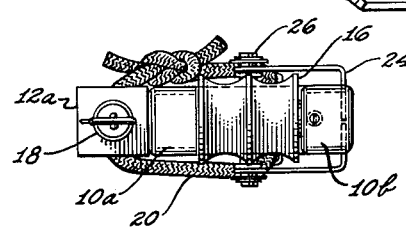
INVENTORS:
Starr W. Cahill
Warren W. White
By Forrest J. Lilly
Attorneys

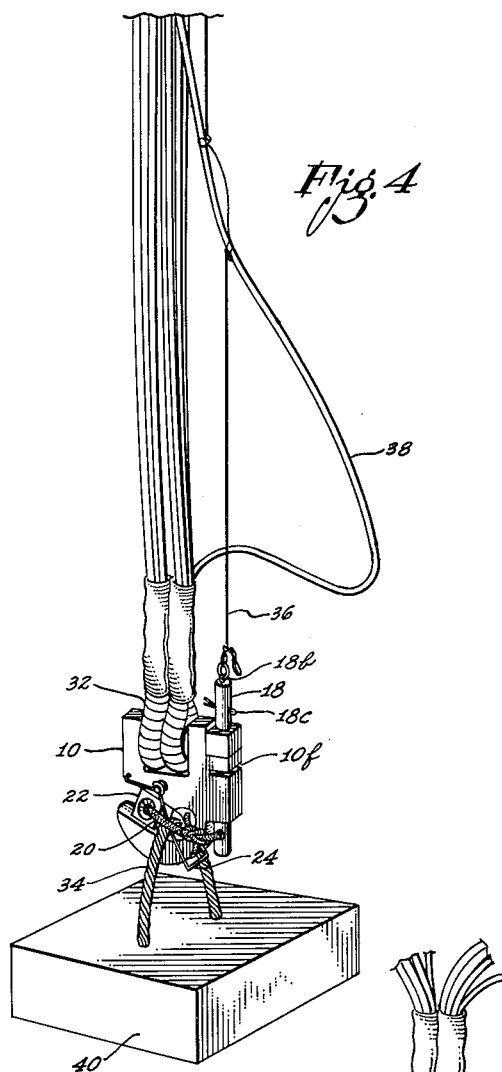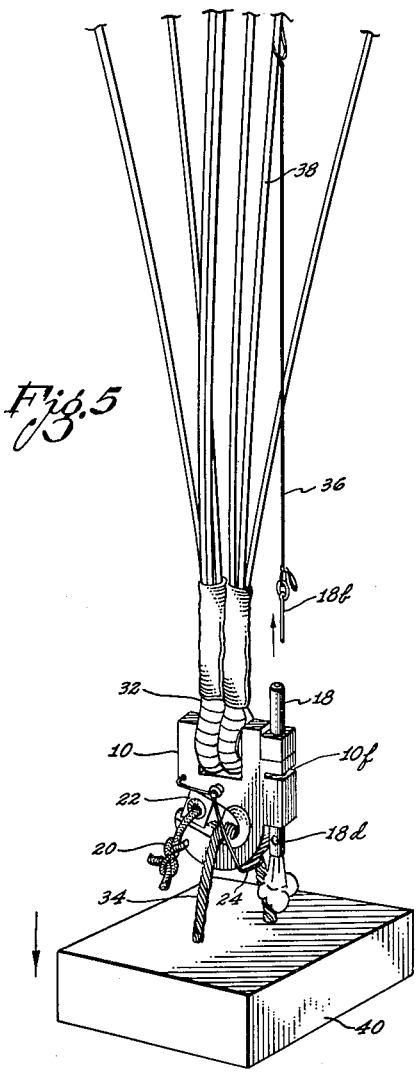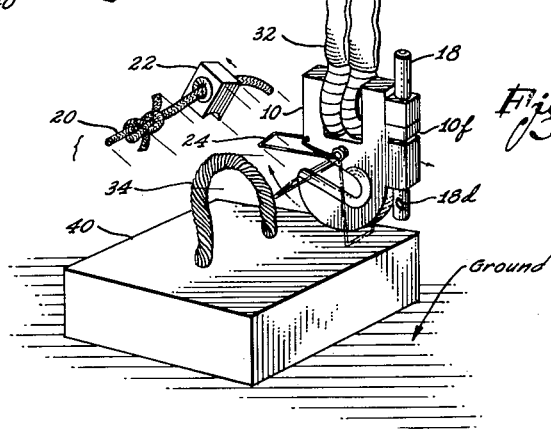

3,028,187
PARACHUTE RELEASE HOOK
Starr W. Cahill, Arcadia, and Warren W. White, Sierra Madre, Calif., assignors to Hycon Mfg. Company, Pasadena, Calif., a corporation of Delaware
Filed Aug. 11, 1958, Ser. No. 754,434
1 Claim. (Cl. 294—83)

Our invention relates generally to parachute hooks and more particularly to a parachute release hook which automatically releases its load immediately upon contact of the load with ground.

The purpose of parachute release hooks is to provide a means for disconnecting the parachute from its load as soon as the load touches ground. This prevents the parachute from dragging the load over rough terrain which may damage or cause loss of the article or material. Such releasable parachute hooks usually require a complex and bulky release mechanism or system for automatic operation. Where, however, releasable prior art hooks approached a wieldable and reasonable size, they were found to be unreliable in operation.

It is an object of our invention to provide a compact parachute release hook which is light in weight but effectively strong, simple in release mechanism that requires little space, and is exceptionally reliable in operation.

Another object of the invention is to provide a parachute release hook in which the release operation is initiated at the descent opening of the parachute.

A further object of our invention is to provide a parachute release hook wherein the load is positively and quickly disconnected from the hook upon contact of the load with ground.

Briefly, and in general terms, we prefer to accomplish the foregoing and other objects by providing a parachute hook assembly which includes a parachute hook for supporting a bail attaching a load, a spring device for normally urging the bail off the parachute hook, a retainer block tied in position before the bail by a cord to secure the spring device under tension in a ready condition, and a reefing cutter for severing the cord to release the block and the spring device. Parachute shroud lines are attached to a thimble which is secured to the normally upper part of the parachute hook on a retaining pin, and the bail attaching a load is placed over the normally lower, upwardly curved part of the parachute hook after the spring device is manually pressed backwards into the ready condition. The retainer block is placed directly in front of the bail and a cord is then used to tie the block in position so that the spring device cannot force the bail off the hook, or so that the bail cannot otherwise twist off the hook. The cord passes through the reefing cutter which is suitably mounted on the parachute hook. The firing pin of the reefing cutter is tied to a shortened shroud line and is pulled out on descent opening of the parachute.

Our invention possesses other objects and features, some of which together with the foregoing, will be set forth in the following detailed description of a preferred embodiment of the invention. The invention will be more fully understood by reading the description with joint reference to the attached drawings, in which:

FIGURE 1 is a side elevational view of a preferred parachute release hook according to our invention;

FIGURE 1a is a longitudinal, sectional view of a reefing cutter;

FIGURE 2 is an end view of the parachute release hook of FIGURE 1 taken along the line 2—2;

FIGURE 3 is another view of the parachute release hook of FIGURE 1 taken in the direction of arrow 3;

FIGURE 4 is a perspective illustrating the parachute release hook attached to a parachute and supporting a load on a bail, in an early condition before dropping of the assembly;

FIGURE 5 is a perspective similar to that of FIGURE 4 but showing the parachute release hook assembly in a condition shortly after the load is dropped and the parachute has opened; and FIGURE 6 is another perspective which depicts the release phase of the parachute release hook at the instant that the load touches ground or the surface of a body of water.

A preferred embodiment of our invention is shown in the views of FIGURES 1, 2 and 3. A parachute release hook or more accurately, parachute release hook assembly, has a parachute hook 10 as its base structure. The hook 10 is preferably of forged steel and has two spaced upright arms 10a and 10b, and a normally lower, upwardly curved hook structure 10c (FIGURE 1). A protruding rectangular block section 10d extends outwardly from the side of the hook 10 and has a circular hole 10e bored centrally over the length of the section 10d. A narrow slot 10f is cut into the section 10d in a plane which is perpendicular to the axis of the hole 10e and reaches a depth tangent to the extreme peripheral wall of the hole 10e. The slot 10f is located at a distance below the top surface of the protruding block section 10d generally as shown in FIGURE 1. At a generally similar distance above the top surface of the block section 10d is drilled two axially aligned holes 10g and 10h in the upright arms 10a and 10b, respectively. The axis of these two holes 10g and 10h is perpendicular to the central axis of hole 10e. A small tapped hole 10i is additionally made into the top surface of arm 10b, parallel with arm 10b and intersects perpendicularly with the axis of hole 10h.

The holes 10g and 10h accommodate the shaft of retainer pin 12 which has a cubical end 12a and a cylindrical shaft 12b. The end of shaft 12b is grooved to engage the end of a set screw 14 which is threaded into the tapped hole 10i. The shaft 12b mounts a thimble 16 to which parachute shroud lines are attached. The cubical end 12a of retainer pin 12 is also bored to provide a hole 12c which is of the same diameter as hole 10e and is normally axially aligned with hole 10e. The holes 10e and 12c receive a reefing cutter 18 which has a cylindrical, tubular housing. The housing of the reefing cutter 18 is grooved 18a at a point along its length generally as indicated in FIGURES 1 and 2, and a retaining Tru-arc ring (not shown) is inserted between slot 10f engaging with the groove 18a on the housing of reefing cutter 18 to secure the cutter 18 in place. The reefing cutter 18 is, for example, a type OA–A2–5 cutter manufactured by Ordnance Associates of South Pasadena, California. The reefing cutter 18 has a conventional firing pin 18b, a safety cotter pin 18c, and a diametrical hole 18d located near the lower end of the housing of the cutter 18.

A longitudinal sectional view of a preferred reefing cutter is shown in FIGURE 1a. The tubular housing H is aluminum and can be approximately 3¼ inches long, have a 5/16 inch outer diameter and a ¼ inch inside diameter. The two ends of the housing H are rolled inwardly in a bevel as illustrated. The normally upper beveled end secures a thin circular disc D which has a small central hole to permit passage of the shaft of the firing pin 18b. The lower end of firing pin 18b passes through a slightly slanting hole 17a drilled through firing plunger P. The plunger P has two other holes drilled into it. Hole 17b intersects with hole 17a right angularly and accommodates a steel ball B of slightly smaller diameter than the hole 17b. The shaft of firing pin 18b forces the steel ball B into engagement with a hole 18e in the housing H as shown. The hole 18e is smaller in diameter than the steel ball B. Another hole 17c is drilled through the plunger P and is aligned with the hole through the housing H which accepts the safety cotter pin 18c. The plunger P is hexagonal and cannot rotate in housing H. The spring S is compressed by the plunger P in the position shown. Withdrawal of the firing pin 18b permits the steel ball B to move into the space provided by the slanting hole 17a, and the plunger P is driven downwards by the compressed spring S.

A small brass cylinder C having two channeled grooves around the sides is secured in position by knurling two (depressed) rings 18f and 18g around the housing H. The depressed housing material internally engages the channeled grooves of the brass cylinder C. The protruding tip of plunger P strikes a primer button C1 through a thin top cover sheet C2 and ignites a pyrotechnic type fuse C3 comprising a train of slow burning powder slugs. After a few seconds, the main powder charge C4 is detonated, blowing out a thin bottom cover sheet C5. The explosion forces gas check seal elements 19a and 19b to move downwards. Element 19a is a cup shaped piston fabricated from soft copper sheet material and element 19b is a small plastic disc. These elements 19a and 19b bear against a tubular cylinder 19c which moves downwards to cut the cord that passes through the hole 18d. A cutting edge is formed at the lower end of cylinder 19c by a countersunk hole having 45 degree flaring walls. Movement of the cylinder 19c is stopped by the lower, inwardly beveled end of the housing H.

A cord 20, nylon for example, is passed through the hole 18d and normally through hole 22a of a generally cubical retainer block 22 and tied together. One face, the normally lower face, of block 22 is concavely grooved over its length and is contoured to ride smoothly on the rounded upper part of the curved hook structure 10c. The retainer block 22 is equal in thickness to that of the parachute hook 10 and has a flat normally upper face which is essentially flush with the upwardly inclined, flat top surface directly above the curved hook structure 10c. The retainer block 22 is normally held against a bail attaching a load, and the bail is braced against spring 24 which is shown in tension against cord 20, however, since the bail and load is omitted in FIGURES 1, 2 and 3. The spring 24 is formed from a length of spring wire by bending into the shape of a square U (see FIGURE 2) and then twisting the ends around a pivot pin 26 which is press fitted through a hole centrally located (FIGURE 1) on the parachute hook 10. The tips of the wire are then bent right angularly inwards and anchored in a small hole drilled near the bottom of arm 10b (see FIGURES 1 and 3). The pivot pin 26 is positioned so that the bottom of spring 24 clears the lowermost point of the curved hook structure 10c and swings in a tangential arc such that the sides of the square U of the spring 24 force the bail and retainer block 22 in the direction that the curved hook structure 10c is pointed. A small washer 28 is placed on each end of the pivot pin 26 and held in place by small Tru-arc rings 30 which engage grooves cut near the ends of the pivot pin 26.

Operation of the parachute release hook is illustrated by the sequential drawings of FIGURES 4, 5 and 6. End loops 32 of the parachute shroud lines are bundled in two parts and looped about the thimble 16 and the retainer pin 12 inserted through hole 10g, the thimble 16 and hole 10h, and set screw 14 screwed down the tapped hole 10i until it engages the groove at the end of the retainer pin 12. The reefing cutter 18 is next inserted through holes 12c and 10e, and a retaining Tru-arc ring is inserted between slot 10f engaging the groove 18a on the housing of reefing cutter 18. The cord 20 is then passed through the hole 18d and the spring 24 pulled back so that bail 34 and retainer block 22 can be slipped down over the curved hook structure 10c. The cord 20 is next passed through the hole 22a in the retainer block 22 and tied firmly as shown in FIGURE 4. Finally, a string 36 is tied on one end to the firing pin 18b and to two or three points of a shortened parachute shroud line 38 on the other end. The bail 34 attaches a load 40 which is sufficiently heavy to hold spring 24 bent back in tension when the load 40 is freely suspended on its bail 34. The safety cotter pin 18c can be pulled prior to operational use. The assembly is shown in substantially ready condition in FIGURE 4 for dropping.

FIGURE 5 illustrates the condition of the assembly after it is dropped and the parachute has opened. Opening of the parachute causes the shortened shroud line 38 to pull string 36 and the attached firing pin 18b. Pulling of the firing pin 18b (FIGURE 1a) releases the small steel ball B inwardly from hole 19 which, in turn, permits spring loaded firing plunger P to strike primer button C1 and ignite the pyrotechnic type fuse C3 which provides a time delay of 6 seconds, for example, before detonating the main powder charge C4 that forces the cup shaped, tubular cylinder 19c downwards to cut the cord 20 passing through hole 18d. This time delay permits the load (and bail) to stabilize on the hook before the cord 20 is cut. The retainer block 22 is released but remains generally in position because of the upward tilt of the curved hook structure 10c. The spring 24 is held bent under tension by the relatively heavy weight of load 40 suspended on bail 34. The instant that the load 40 touches ground, the bail 34 will be relieved of the weight of the load 40. During that brief moment, the spring 24 swings arcuately upwards and forces the bail 34 and retainer block 22 of the curved hook structure 10c as indicated in FIGURE 6. This action occurs even with a strong cross wind blowing constantly. It is noted that the retainer block 22 prevents binding of the cut cord 20 with the bail 34 during the release operation.

Thus, there is provided a comparatively small and compact parachute release hook mechanism which automatically disengages its load upon contact with the ground. The mechanism is relatively simple in structure and therefore extremely reliable in operation. Initiation of the release operation is novelly dependent upon the actual descent opening of the parachute, and accordingly an extended timing program device is unnecessary. A release structure is provided wherein the load is positively and surely disconnected from the parachute hook without binding or failure of disengagement. The mechanism can always be kept in a ready condition and is useable under all weather conditions. Finally, but not least, a high strength hook is maintained which can support very heavy loads.

Although some component types and data have been indicated in the foregoing description, specific data are given as examples only, and do not necessarily restrict or limit the scope of our invention. It is to be understood that the particular embodiment of the invention described above and shown in the drawings is merely illustrative of and not restrictive of our broad invention, and that various changes in design, structure and arrangement may be made without departing from the spirit and scope of the broader of the appended claim.

We claim:

A parachute release hook, comprising: a hook member including two normally upper, spaced upright arms, a block section protruding from one side of said hook member, and a normally lower, upwardly curved hook element forming a passageway with a lower surface of said hook member and extending from the block section side for supporting a bail attaching a load, said spaced upright arms having respective upper holes which are axially aligned, said block section having a hole extending lengthwise therethrough, and said upwardly curved hook element having a rounded upper surface parallel to the lower surface of said hook member; a retainer pin having an enlarged head, said retainer pin engaging the axially aligned holes in said upright arms and adapted to be attached to parachute shroud lines, the enlarged head of said retainer pin having a hole extending therethrough which is normally axially aligned with the hole in said block section; a U-shaped spring bracketing said hook member and pivoted for angular movement over the length of said curved hook element, said spring being adjustable in position against spring tension for urging the bail off said curved hook element; a reefing cutter mounted in the axially aligned holes in said enlarged head and block section, said reefing cutter being secured in position to said hook member to provide a normally lower connection point beyond the extreme adjusted spring position; a retainer block fitting between said passageway and having a concavely grooved lower surface for riding smoothly on the rounded upper surface of said upwardly curved hook element, said retainer block being normally positioned before the bail and having a central opening therein; and a cord passing through the central opening of said retainer block securing said spring to said reefing cutter to prevent said spring from forcing the bail off said curved hook element, said reefing cutter severing said cord after energization thereof.

References Cited in the file of this patent

UNITED STATES PATENTS

| | | |
|---|---|---|
| 2,616,748 | Hight | Nov. 4, 1952 |
| 2,831,721 | Gross | Apr. 22, 1958 |